(12) United States Patent
Koch

(10) Patent No.: US 11,325,046 B1
(45) Date of Patent: May 10, 2022

(54) SYSTEMS AND METHODS FOR DETERMINING SELLER REPUTATION

(71) Applicant: Mythical, inc., Sherman Oaks, CA (US)

(72) Inventor: Rudy Koch, Seattle, WA (US)

(73) Assignee: Mythical, Inc., Sherman Oaks, CA (US)

( * ) Notice: Subject to any disclaimer, the term of this patent is extended or adjusted under 35 U.S.C. 154(b) by 18 days.

(21) Appl. No.: 15/929,469

(22) Filed: May 4, 2020

(51) Int. Cl.
*A63F 13/00* (2014.01)
*A63F 13/79* (2014.01)
*A63F 13/35* (2014.01)

(52) U.S. Cl.
CPC .............. *A63F 13/79* (2014.09); *A63F 13/35* (2014.09)

(58) Field of Classification Search
CPC .......... A63F 13/79; A63F 13/35; A63F 13/45; A63F 13/795; A63F 13/69; A63F 13/822; A63F 13/71; A63F 13/87; A63F 13/798; A63F 13/358; A63F 13/833; A63F 13/216; A63F 2300/532; A63F 2300/407; A63F 2300/5593; A63F 2300/609; A63F 2300/5533; A63F 2300/5566; A63F 2300/572; A63F 2300/558; A63F 2300/5573; A63F 2300/513; A63F 2300/534
USPC .......................................................... 463/42
See application file for complete search history.

(56) References Cited

U.S. PATENT DOCUMENTS

| | | | |
|---|---|---|---|
| 9,452,356 B1 | 9/2016 | Tsao | |
| 10,765,948 B2 * | 9/2020 | Eatedali | ................ A63F 13/798 |
| 11,179,638 B1 | 11/2021 | Linden | |
| 11,179,640 B1 | 11/2021 | Koch | |
| 11,192,036 B1 | 12/2021 | Koch | |
| 2005/0137015 A1 * | 6/2005 | Rogers | ................... G06Q 30/02 463/42 |
| 2006/0100006 A1 * | 5/2006 | Mitchell | ................. G07F 17/32 463/9 |
| 2006/0190392 A1 * | 8/2006 | Samid | ................. G07F 17/3279 705/37 |
| 2007/0099685 A1 | 5/2007 | Van Luchene | |
| 2007/0202951 A1 | 8/2007 | Bogosian | |

(Continued)

FOREIGN PATENT DOCUMENTS

WO 2020247002 12/2020

OTHER PUBLICATIONS

Rockstarflipper, "Ebay for Beginners, Episode #5. Top Rated Seller & Feedback"—(https://www.youtube.com/watch?v=6tk9sZ95ZW8), Mar. 19, 2017 (Year: 2017).*

(Continued)

*Primary Examiner* — Michael A Cuff

(74) *Attorney, Agent, or Firm* — Esplin & Associates, PC

(57) ABSTRACT

Systems and methods for determining seller reputation for users of an online gaming platform are disclosed. Exemplary implementations may: execute an instance of the game; monitor sales transactions; determine a sales metric that represents a sales reputation ascribed to a given user; monitor in-game actions of the given user that do not include sales transactions; determine in-game action metrics for the monitored in-game actions; and determine a combined reputational score based on the sales metric and the in-game action metrics.

16 Claims, 4 Drawing Sheets

(56) References Cited

U.S. PATENT DOCUMENTS

| | | |
|---|---|---|
| 2009/0318221 A1 | 12/2009 | Dhunjishaw |
| 2009/0325690 A1 | 12/2009 | Zhou |
| 2010/0205430 A1* | 8/2010 | Chiou ................ G06Q 30/0282 |
| | | 713/156 |
| 2011/0183749 A1 | 7/2011 | Allen |
| 2011/0312424 A1 | 12/2011 | Burckart |
| 2013/0172086 A1 | 7/2013 | Ikenaga |
| 2014/0011595 A1* | 1/2014 | Muller .................... A63F 13/35 |
| | | 463/42 |
| 2014/0162781 A1* | 6/2014 | Butler .................. A63F 13/798 |
| | | 463/31 |
| 2015/0224409 A1 | 8/2015 | Hayashida |
| 2015/0375103 A1 | 12/2015 | George |
| 2016/0005270 A1* | 1/2016 | Marr .................. G07F 17/3227 |
| | | 463/25 |
| 2017/0095741 A1 | 4/2017 | Perry |
| 2018/0178125 A1 | 6/2018 | Perry |
| 2020/0090143 A1 | 3/2020 | Iervolino |
| 2020/0202668 A1 | 6/2020 | Cotta |
| 2020/0294133 A1 | 9/2020 | Cella |
| 2020/0311721 A1 | 10/2020 | Ow |
| 2021/0052981 A1 | 2/2021 | Min |
| 2021/0106920 A1 | 4/2021 | Lim |

OTHER PUBLICATIONS

Wood, Mike, "How to Leave Feedback on Ebay",—(https://www.youtube.com/watch?v=EIY1uTuAixA), May 25, 2017 (Year: 2017).*

* cited by examiner store interface 40

| inventory 41 | | |
|---|---|---|
| Items: | Seller information: | Buy? |
| virtual item 1 | seller information 1 | ☐ |
| virtual item 2 | seller information 2 | ☐ |
| virtual item 3 | seller information 3 | ☐ |
| virtual item 4 | seller information 4 | ☐ |
| virtual item 5 | seller information 5 | ☐ | action button 42

*Fig. 4A* store interface 45

| inventory 46 | | |
|---|---|---|
| Items: | Seller information: | Buy? |
| virtual item 2 | seller information 2 ⋁ | ☐ |
| virtual item 1 | seller information 1 | ☐ |
| virtual item 3 | seller information 3 | ☐ |
| virtual item 5 | seller information 5 | ☐ |
| *virtual item 4* | *seller information 4* 👎 | ☐ | action button 47 indicator 48 indicator 49

*Fig. 4B*

SYSTEMS AND METHODS FOR DETERMINING SELLER REPUTATION

FIELD OF THE DISCLOSURE

The present disclosure relates to systems and methods for determining and using seller reputations of users of an online gaming platform.

BACKGROUND

Online gaming platforms are known. Selling digital in-game assets to the users of online gaming platforms is known. Monitoring certain actions such as winning, losing, and levelling up of users within online gaming platforms is known.

SUMMARY

One aspect of the present disclosure relates to a system configured to determine seller reputation for a user of an online gaming platform. As described herein, an individual user's (sales) reputation may depend on a combination of multiple factors, including but not limited to information related to sales transactions, information related to in-game actions that do not include sales transactions, and/or other information. The system may comprise one or more hardware processors configured by machine-readable instructions. The system may execute an instance of a game within the online gaming platform to facilitate presentation of the game to the user. The system may implement in-game actions in the instance of the game in response to action requests for the in-game actions by the user. The presentation of the game may be based on views of the game that are determined during execution of the game. The system may monitor sales transactions in which the user is selling virtual items that are usable within the online gaming platform to one or more buyers. The system may determine a metric value of a sales metric that represents a sales reputation ascribed to the user by the one or more buyers subsequent to the monitored sales transactions. The system may monitor user-specific in-game actions of the user within the online gaming platform. These user-specific in-game actions may not include the sales transactions. The system may determine one or more second metric values of one or more user-specific in-game action metrics that represent at least one of activities and accomplishments of the user within the online gaming platform, based on the user-specific in-game actions. The system may determine a combined reputational score for the user. Determination of the combined reputational score may be based on both the metric value of the sales metric and the one or more second metric values of the one or more user-specific in-game action metrics. The system may present, to one or more users of the online gaming platform, an indicator that represents the combined reputational score for the user.

Another aspect of the present disclosure relates to a method for determining seller reputation for a user of an online gaming platform. The method may include executing an instance of a game within the online gaming platform to facilitate presentation of the game to the user. The method may include implementing in-game actions in the instance of the game in response to action requests for the in-game actions by the user. The presentation of the game may be based on views of the game that are determined during execution of the game. The method may include monitoring sales transactions in which the user is selling virtual items that are usable within the online gaming platform to one or more buyers. The method may include determining a metric value of a sales metric that represents a sales reputation ascribed to the user by the one or more buyers subsequent to the monitored sales transactions. The method may include monitoring user-specific in-game actions of the user within the online gaming platform. The user-specific in-game actions may not include the sales transactions. The method may include determining one or more second metric values of one or more user-specific in-game action metrics that represent at least one of activities and accomplishments of the user within the online gaming platform, based on the user-specific in-game actions. The method may include determining a combined reputational score for the user. Determination of the combined reputational score may be based on both the metric value of the sales metric and the one or more second metric values of the one or more user-specific in-game action metrics. The method may include presenting, to one or more users of the online gaming platform, an indicator that represents the combined reputational score for the user.

As used herein, any association (or relation, or reflection, or indication, or correspondency) involving servers, processors, client computing platforms, transactions, sellers, buyers, metrics, metric values, reputations, actions, scores, instructions, operations, determinations, presentations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 4A-4B illustrate user interfaces, as may be used in a system as described, in accordance with one or more implementations.

DETAILED DESCRIPTION

Figure 1:
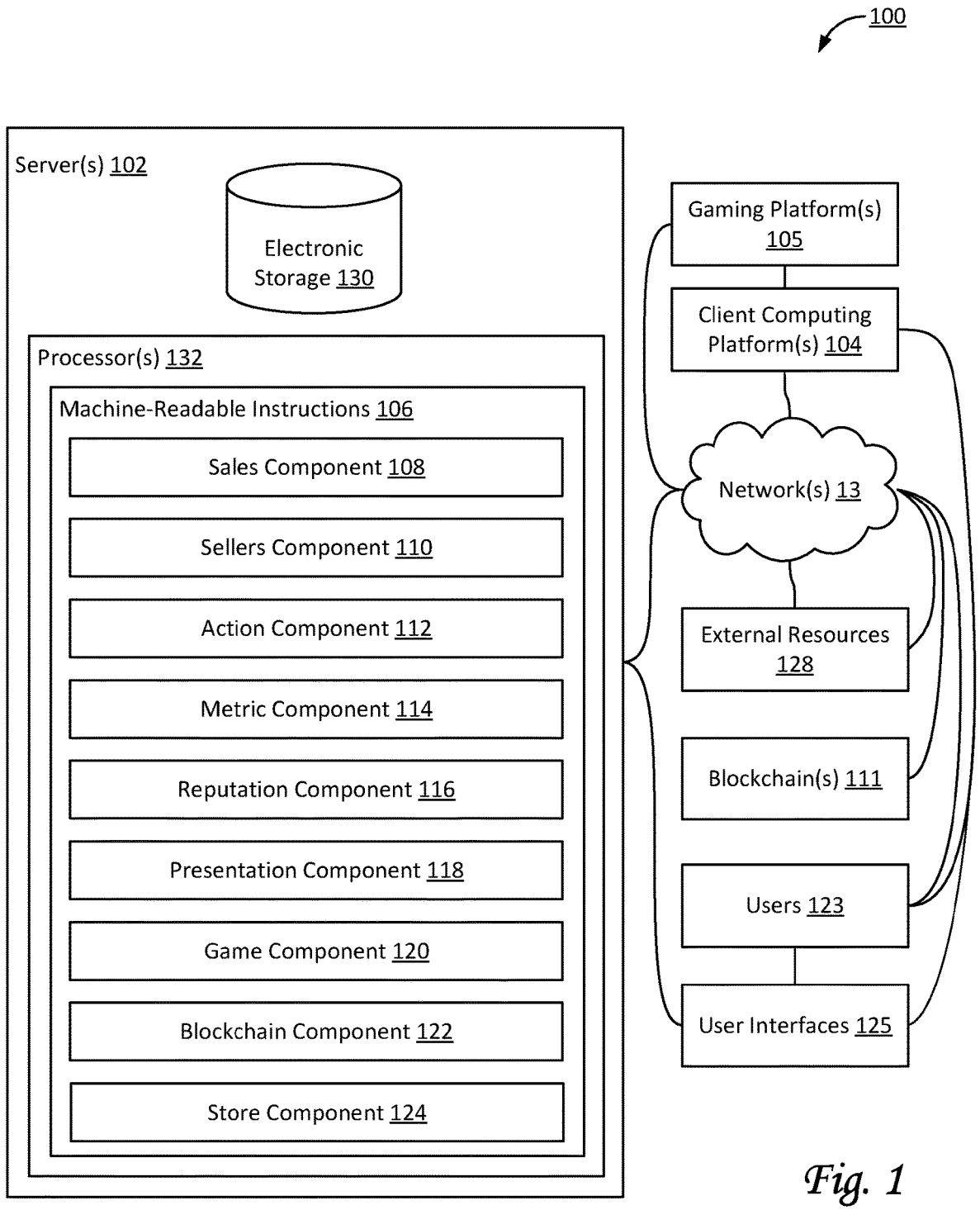
FIG. 1 illustrates a system configured for determining seller reputation for a user of an online gaming platform, in accordance with one or more implementations.

FIG. 1 illustrates a system 100 configured for determining seller reputations for users 123 of one or more gaming platforms 105 (e.g., an online gaming platform), in accordance with one or more implementations. An individual user's reputation may depend on a combination of multiple factors, including but not limited to information related to one or more sales transactions, information related to one or more in-game actions that do not include sales transactions, and/or other information. In some implementations, buyers may prefer and/or otherwise be more inclined to purchase from a seller having a higher reputation, compared to another seller having a lower reputation in comparison. In some implementations, operations by gaming platform 105, including but not limited to internal operations, may be determined, at least in part, based on a seller's reputation, such that a first seller having a poor reputation may have a different experience interacting with gaming platform 105 than a second seller having a stellar reputation. In some implementations, system 100 may include one or more of electronic storage 130, one or more servers 102, one or more client computing platforms 104, one or more gaming platforms 105, one or more blockchains 111, one or more external resources 128, and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. Users 123 (also referred to as players) may include one or more of a first user, a second user, a third user, a fourth user, and/or other users. A user who sells or offers for sale a virtual item to another user may be referred to as a seller. A user who buys (or who might buy) a virtual item may be referred to as a buyer.

In some implementations, system 100 and/or server(s) 102 may be configured to communicate with one or more of (online) gaming platform(s) 105, users 123, blockchain(s) 111, and/or other components. As used herein, gaming platform 105 may refer to either an individual game, a type of gaming console and its ecosystem, and/or both. Gaming platform 105 may be operated, hosted, and/or owned by a stakeholder of gaming platform 105. Users 123 may include players who play on gaming platform 105. In some implementations, gaming platform 105 may include an online store that sells and/or otherwise transfers (in-game) virtual items that may be used within gaming platform 105. In some implementations, gaming platform 105 (and/or another component of system 100) may support an exchange and/or marketplace for users 123 such that different users 123 can sell, purchase, trade, and/or otherwise exchange (in-game) virtual items that may be used within gaming platform 105 and/or may be useful within gaming platform 105. In some implementations, users can sell, purchase, trade, and/or otherwise exchange (in-game) virtual items through (external) online sales platforms, including but not limited to eBay™. In some implementations, users can sell, purchase, trade, and/or otherwise exchange (in-game) virtual items through one or more blockchains 111.

In some implementations, system 100 may include blockchain 111 that may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain(s) 111. The smart contracts may be stored on blockchain(s) 111. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

A distributed blockchain may act as a (decentralized) database that stores a registry and/or ledger of assets and transactions across one or more networks. In some implementations, a ledger may be implemented as a database. For example, a blockchain is a type of ledger, as well as a type of decentralized database that stores a registry of assets and transactions. A given asset may be owned by a particular user. An asset may include anything of material value or usefulness that is owned by or on behalf of one or more users. In some implementations, a virtual item (that may be used within gaming platform 105 and/or may be useful within gaming platform 105) may be represented by an asset that is recorded on one or more blockchains 111. In some implementations, a right pertaining to an object (e.g., a benefit) may be an asset, the object being a physical or a virtual item. Multiple rights may form a set of rights or a bundle of rights that may be transferred and/or otherwise acted on and/or operated on together. For example, rights may include one or more of a right to use, a right to sell, a right to destroy, and/or other rights.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111.

In some implementations, blockchain(s) 111 may record and/or register ownership of assets (including virtual items). Alternatively, and/or simultaneously, blockchain(s) 111 may register transactions that modify ownership of assets. A smart contract may be a type of asset. In some implementations, once a smart contract has been added to a blockchain, the smart contract may be referred to as published, posted, registered, and/or recorded. Elements of blockchain(s) 111 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain(s) 111 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Server(s) 102 may be configured by machine-readable instructions 106. Machine-readable instructions 106 may include one or more instruction components. The instruction components may include computer program components. The instruction components may include one or more of a sales component 108, a sellers component 110, an action component 112, a metric component 114, a reputation component 116, a presentation component 118, a game component 120, a blockchain component 122, a store component 124, and/or other instruction components.

Sales component 108 may be configured to monitor sales transactions in system 100, including but not limited to one or more of transactions of items between users 123 within gaming platform 105, transactions involving items within blockchain 11, transactions involving items within (external) online sales platforms, and/or other types of transactions. In some implementations, monitoring may be limited to transactions involving virtual items (e.g., virtual items that are usable within gaming platform 105). In some implementations, monitoring may include transactions of either virtual or physical items. In some implementations, monitoring may be user-specific. For example, sales component 108 may monitor one or more types of sales transactions involving a given user 123. The types of transactions may include one or more of selling transactions, buying transactions, auctions, and/or other types of transactions. For example, a sales transaction may involve the given user selling a virtual item to a given buyer (e.g., another user of gaming platform 105, or of system 100).

In some implementations, sales component 108 may be configured to receive and/or solicit feedback and/or ratings from buyers. For example, sales component 108 may receive feedback and/or ratings from one or more buyers regarding monitored sales transactions involving the one or more buyers. In some implementations, feedback and/or ratings may be aggregated, organized, and/or otherwise processed for individual sellers.

Sellers component 110 may be configured to determine sales metrics for users 123, e.g., for individual sellers. In some implementations, sellers component 110 may determine a given metric value of a given sales metric for a given seller, the given sales metric representing a sales reputation of the given seller. In some implementations, determinations by sellers component 110 may be based on feedback and/or ratings received by sales component 108. In some implementations, a positive or high sales reputation may represent content and/or satisfied buyers (based on previously completed purchases by the buyers from a given seller). In such cases, improving a sales reputation may correspond to increasing the given metric value. In some implementations, a negative or low sales reputation may represent discontent and/or dissatisfied buyers (based on previously completed purchases by the buyers from the given seller). In such cases, tarnishing, diminishing, and/or deteriorating a sales reputation may correspond to decreasing the given metric value. In some implementations, a given metric value of a given sales metric may be numerical, such as a percentage between 0-100%. In some implementations, the given metric value may be represented by a letter score from A to F, or by a color selected from bronze-silver-gold or red-yellow-green, and/or by other non-numerical values or ranges. In some implementations, buyers may voluntarily provide feedback on a given sales transaction. Alternatively, and/or simultaneously, in some implementations, system 100 may solicit feedback from buyers. In some implementations, sales metrics may account for sales experience (e.g., having a greater number of completed transactions may increase a seller's sales reputation).

Action component 112 may be configured to monitor actions by individual users 123, including but not limited to in-game actions within gaming platform 105. In some implementations, monitoring by action component 112 may exclude one or more types of transactions. In some implementations, monitoring by action component 112 may be user-specific. In some implementations, monitoring by action component 112 may distinguish between different types of actions. For example, the actions may include one or more types of activities that may be performed by individual users 123. Alternatively, and/or simultaneously, the actions may include one or more types of accomplishments that may be accomplished by individual users 123. For example, the one or more types of activities may be monitored and/or counted by virtue of occurring within gaming platform 105 (e.g., without regard for a particular result and/or outcome). By way of non-limiting example, activities may include chatting, sharing, collaborating, helping, healing, and/or other activities, as well as behaviors. For example, the one or more types of accomplishments may be monitored based on a result or goal being completed, reached, and/or otherwise accomplished. By way of non-limiting example, accomplishments may include reaching a given experience level or XP, beating a given score, winning a race or battle, earning a medal, killing the final "boss" in a level or mission, reaching a threshold, spending a given amount of time within the game, and/or other accomplishments, as well as results. In some implementations, accomplishments may be discrete and/or otherwise measurable.

In some implementations, one or more types of activities may be negative, i.e., having a negative effect on a given user's reputational score. In some implementations, one or more types of activities may be positive. In some implementations, one or more types of accomplishments may be negative. In some implementations, one or more types of accomplishments may be positive. In some implementations, a particular type of activity or accomplishment may be considered positive in a first context (such as a particular game) and negative in a second context (such as a different game). For example, selfish game-play may be considered positive in certain sports, but negative in other sports.

Metric component 114 may be configured to determine action metrics for users 123, e.g., in-game action metrics for individual sellers. In some implementations, metric component 114 may determine a given metric value of a given user-specific in-game action metric for a given seller, the given sales metric representing at least one (type) of activities and accomplishments of the given seller. In some implementations, determinations by metric component 114 may be based on in-game actions monitored by action component 112. In some implementations, metric component 114 may use separate metrics for activities and for accomplishments. In some implementations, metric component 114 may use separate metrics for positive and negative in-game actions.

Reputation component 116 may be configured to determine reputational scores for individual users 123, e.g., combined reputational scores for individual sellers. In some implementations, determining a reputational score may be based on a combination of multiple factors, including but not limited to a given metric value of a sales metric (determined by sellers component 110), one or more given metric values of in-game action metrics (determined by metric component 114), and/or other information. In some implementations, reputational scores may be numerical. In some implementations, reputational scores may be non-numerical. In some implementations, reputation component 116 may use weights and/or weighting factors for different metric values, to determine combined reputational scores. In some implementations, individual buyers may adjust and/or select these weights and/or weighting factors. For example, a given buyer may heavily favor sellers who actively help other players in a game, whereas another buyer may prefer sellers who are proficient at killing enemies. In some implementations, an individual buyer may select to automatically adjust these weight and/or weighting factors such that sellers whose in-game actions are similar to the individual buyer's in-game actions have higher reputational scores than other sellers whose in-game actions are dissimilar (or less similar) to the individual buyer's in-game actions. In other words, a buyer may prefer sellers whose gameplay matches their own. In some implementations, these weights and/or weighting factors may automatically be adjusted over time, so that the effects on individual in-game actions fade over time. For example, a recent in-game action of a given type may have a greater effect on a reputational score than a similar in-game action of the same given type that occurred last week, or last month. In some implementations, these reputational scores may be shared with (prospective) buyers, e.g., through presentation component 118. In other cases, these reputational scores may be used to control operations of one or more of gaming platform 105, online sales platforms, and/or other components of system 100, including but not limited to internal operations (such as, e.g., operations that users are not explicitly notified about).

Presentation component 118 may be configured to present indicators to users 123. In some implementations, the indicators may represent (combined) reputational scores as determined by reputation component 116. In some implementations, individual indicators may be associated with individual sellers. For example, a given combined reputational score for a given user may be presented in a view of the game during gameplay, e.g., as another statistic of the given user. In some implementations, a combined reputational score may be presented during a transaction involving the given user. In some implementations, a combined reputational score may be present in a store interface. In some implementations, presentation component 118 may be configured to present user interfaces to users 123, e.g., through client computing platforms 104.

Figure 3A:
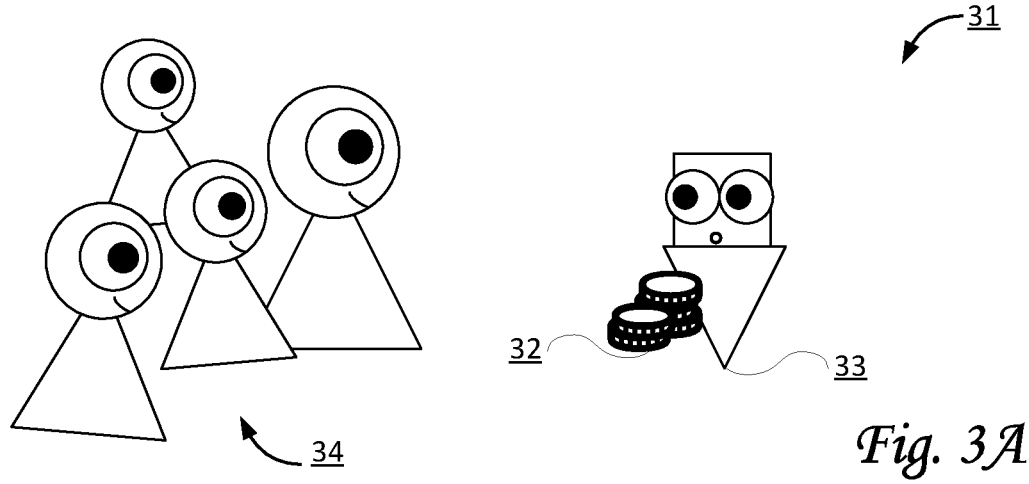
FIGS. 3A-3B illustrate an occurrence of an in-game action that has an effect on a seller reputation, as may occur in a system as described, in accordance with one or more implementations.
Figure 3B:
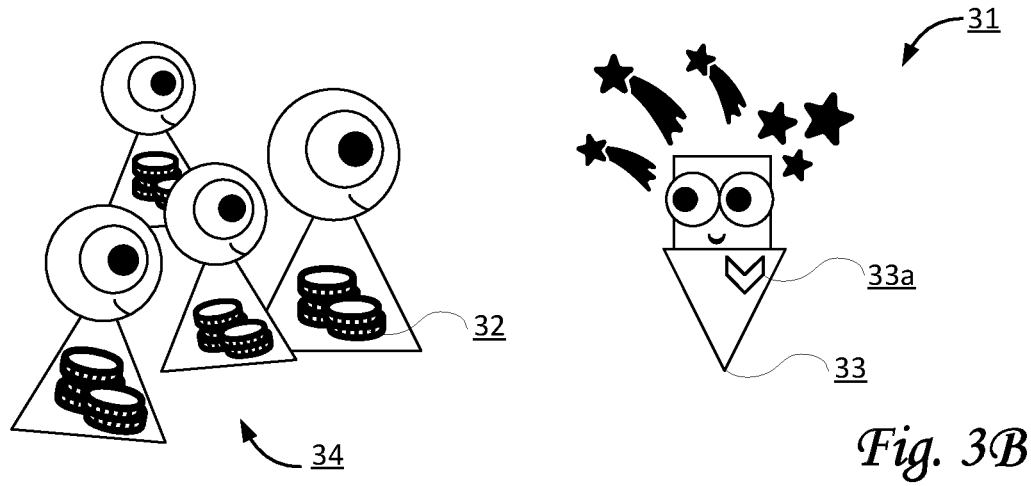

By way of non-limiting example, FIGS. 3A-3B illustrate an occurrence of in in-game action that has an effect on a seller reputation in a game played by (user-controlled) in-game character 33 in a topography 31. In-game character 33 may be controlled by a user who is also a seller of virtual items in the game. As depicted, in-game character 33 may interact with one or more other players 34 within the game. For example, other players 34 may request help or assistance by in-game character 33. In-game character 33 may own some coins 32, e.g., in an inventory of virtual items. Subsequently to FIG. 3A, as depicted in FIG. 3B, in-game character 33 may give some coins 32 to other players 34, e.g., from his inventory, to provide help or assistance. This in-game action may be monitored, and may contribute to one or more user-specific in-game action metrics of in-game character 33, and may increase the combined reputational score for in-game character 33. Subsequently, an indicator 33a may be presented, as depicted in FIG. 3B, that represents an increase of the combined reputational score for in-game character 33 (or the current level/range of the combined reputational score). Indicator 33a may be presented in views of the game so other users can see or know this indicator is associated with in-game character 33.

Game component 120 may be configured to execute an instance of a game (e.g., an online game within gaming platform 105) to facilitate presentation of the game to users 123, and/or to implement in-game actions in the instance of the game, e.g., in response to action requests for the in-game actions by users 123. The game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space.

Blockchain component 122 may be configured to perform actions on blockchain 111, including but not limited to recording transactions/transfers of assets, recording and/or verifying ownership of assets, recording changes in ownership, analyzing ownership of particular assets (e.g., through the history of recorded transactions), and/or other actions. For example, in some implementations, components of system 100 may use one or more functions provided by blockchain component 122 to perform one or more of the actions and/or features attributed to system 100, including but not limited to monitoring transactions and/or in-game actions. For example, in some implementations, assets may be implemented as smart contracts on blockchain 111. A verification of asset-ownership may accordingly be implemented as a function on a particular smart contract. Moreover, a transfer of ownership may be implemented by recording and/or storing an address (that identifies the new owner of a particular asset) to blockchain 111 and/or the particular smart contract.

Referring to FIG. 1, store component 124 may be configured to present store interfaces to users 123. In some implementations, a store interface may be a type of user interface.

By way of non-limiting example, FIG. 4A depicts a store interface 40, as may be presented to an individual buyer looking to purchase a virtual item in the game. Available virtual items for purchase may be presented as an inventory 41, including a list of virtual items (from 1 to 5), associated seller information (from 1 to 5), and graphical user interface elements (here, action buttons) that enable the individual buyer to initiate a purchase, such as, for example an action button 42 that would, upon activation by the individual buyer, initiate a purchase of virtual item 1. In some implementations, the associated virtual seller information (here, seller information 1 to 5) may include indicators that represent (values of) sales metrics as determined by sellers component 110. For example, store interface 40 may be presented to the individual buyer prior to the events depicted in FIG. 3A.

By way of non-limiting example, FIG. 4B depicts a store interface 45, as may be presented to the individual buyer looking to purchase a virtual item in the game. Available virtual items for purchase may be presented as an inventory 46, including a list of virtual items (from 1 to 5), associated seller information (from 1 to 5, corresponding to seller 1 to seller 5), and graphical user interface elements (here, action buttons) that enable the individual buyer to initiate a purchase, such as, for example an action button 47 that would, upon activation by the individual buyer, initiate a purchase of virtual item 2. Store interface 45 may include an indicator 48 that is presented to the individual buyer. Indicator 48 may represent the combined reputational score for a particular seller (here, the seller of virtual item 2). For example, store interface 45 may be presented to the individual buyer subsequent to the events depicted in FIG. 3B (with the seller of virtual item 2 being associated with in-game character 33 in FIG. 3B). Regarding FIG. 4B, in some implementations, the list of virtual items (from 1 to 5), associated sellers, and/or associated seller information (from 1 to 5) may be ranked, ordered, and/or otherwise organized according to combined reputational scores for the sellers (seller 1 to seller 5). For example, as depicted, the combined reputational scores for sellers 1 to 5 may be ranked from highest to lowest as follows: seller 2, seller 1, seller 3, seller 5, seller 4. Additionally, an indicator 49 (e.g., a graphical user interface element) may be presented to represent a particularly low combined reputational score for a particular seller (here, the seller of virtual item 4). Perhaps this seller kicked a virtual puppy. Perhaps the individual buyer would rather not purchase anything from this particular seller, in light of such an in-game action and/or the corresponding combined reputational score.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of store interface.

Referring to FIG. 1, in some implementations, server(s) 102, client computing platform(s) 104, and/or external resources 128 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 128 may include sources of information outside of system 100, external entities participating with system 100, and/or other resources. For example, in some implementations, external resources 128 may include an online sales platform through which assets may be purchased and sold between different users. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, and/or 124, and/or other components. Processor(s) 132 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 132 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 132 may be configured to execute one or more additional components that may perform some or all of the functionality attributed below to one of components 108, 110, 112, 114, 116, 118, 120, 122, and/or 124.

Figure 2:
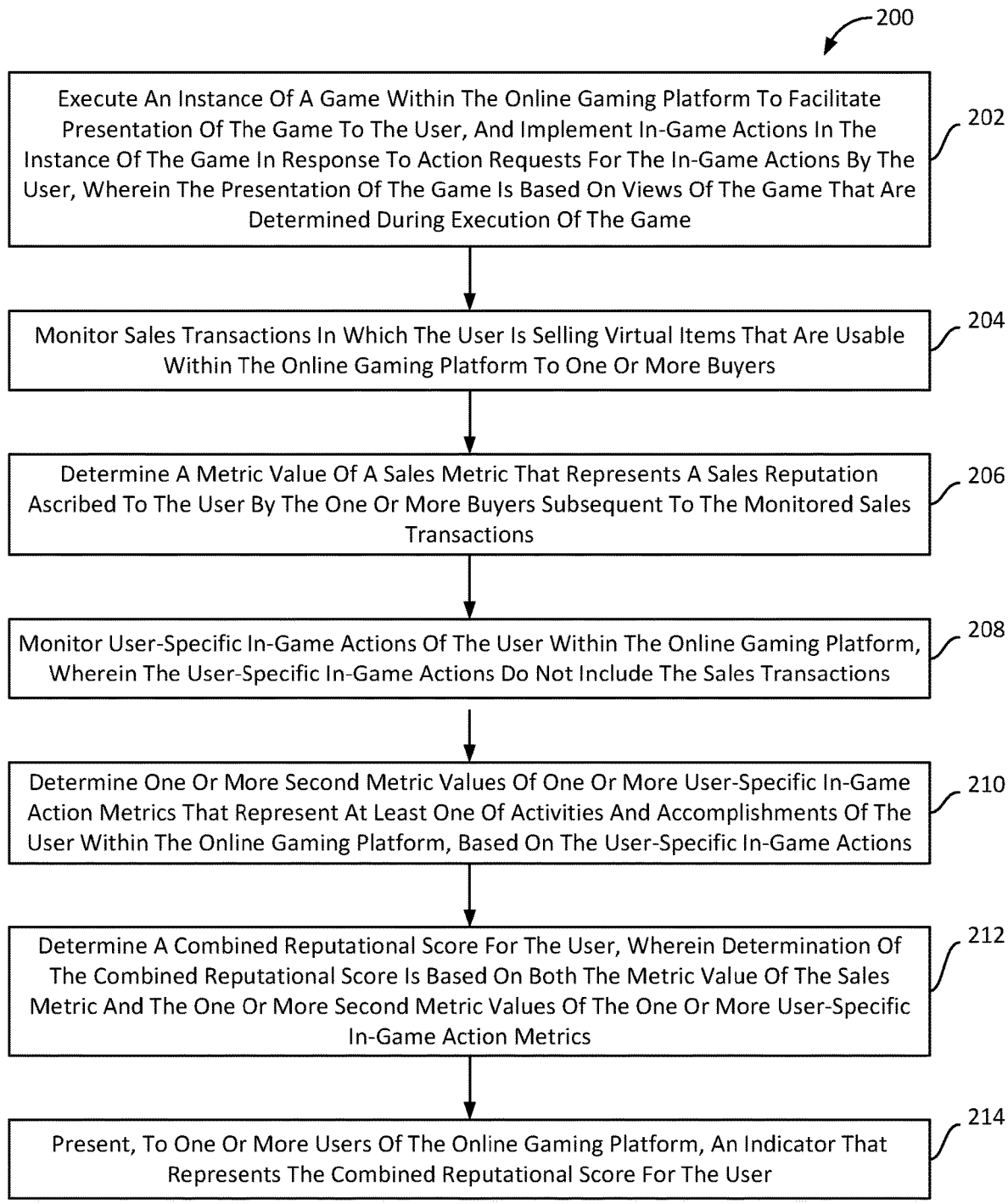
FIG. 2 illustrates a method for determining seller reputation for a user of an online gaming platform, in accordance with one or more implementations.

FIG. 2 illustrates a method 200 for determining seller reputation for a user of an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game within the online gaming platform is executed to facilitate presentation of the game to the user. In-game actions in the instance of the game are implemented in response to action requests for the in-game actions by the user. The presentation of the game is based on views of the game that are determined during execution of the game. In some embodiments, operation 202 is performed by a game component the same as or similar to game component 120 (shown in FIG. 1 and described herein).

At an operation 204, sales transactions are monitored in which the user is selling virtual items that are usable within the online gaming platform to one or more buyers. In some embodiments, operation 204 is performed by a sales component the same as or similar to sales component 108 (shown in FIG. 1 and described herein).

At an operation 206, a metric value of a sales metric is determined that represents a sales reputation ascribed to the user by the one or more buyers subsequent to the monitored sales transactions. In some embodiments, operation 206 is performed by a sellers component the same as or similar to sellers component 110 (shown in FIG. 1 and described herein).

At an operation 208, user-specific in-game actions of the user are monitored within the online gaming platform. The user-specific in-game actions do not include the sales transactions. In some embodiments, operation 208 is performed by an action component the same as or similar to action component 112 (shown in FIG. 1 and described herein).

At an operation 210, one or more second metric values of one or more user-specific in-game action metrics are determined that represent at least one of activities and accomplishments of the user within the online gaming platform, based on the user-specific in-game actions. In some embodiments, operation 210 is performed by a metric component the same as or similar to metric component 114 (shown in FIG. 1 and described herein).

At an operation 212, a combined reputational score is determined for the user. Determination of the combined reputational score is based on both the metric value of the sales metric and the one or more second metric values of the one or more user-specific in-game action metrics. In some embodiments, operation 212 is performed by a reputation component the same as or similar to reputation component 116 (shown in FIG. 1 and described herein).

At an operation 214, an indicator is presented, to one or more users of the online gaming platform, that represents the combined reputational score for the user. In some embodiments, operation 214 is performed by a presentation component the same as or similar to presentation component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for determining seller reputation for a user of an online gaming platform, the method comprising:
    executing an instance of a game within the online gaming platform to facilitate presentation of the game to the user, and implementing in-game actions in the instance of the game in response to action requests for the in-game actions by the user, wherein the presentation of the game is based on views of the game that are determined during execution of the game;
    monitoring sales transactions in which the user is selling virtual items that are usable within the online gaming platform to one or more buyers;
    determining a metric value of a sales metric that represents a sales reputation score ascribed to the user by the one or more buyers, wherein the metric value is based on the monitored sales transactions;
    presenting, to one or more users of the online gaming platform, a store interface that depicts multiple potential sellers as ranked in accordance to sales reputation scores for the multiple potential sellers, including the user being ranked in accordance to the sales reputation score represented by the metric value of the sales metric;
    monitoring user-specific in-game actions performed by the user within the instance of the game, wherein the user-specific in-game actions do not include the sales transactions;
    determining one or more second metric values of one or more user-specific in-game action metrics that represent in-game activities performed by the user within the instance of the game, wherein determination is based on the user-specific in-game actions as monitored, and is not based on the sales transactions;
    determining a combined reputational score for the user, wherein determination of the combined reputational score is based on combining both the metric value of the sales metric and the one or more second metric values of the one or more user-specific in-game action metrics, wherein the combined reputational score for the user is different from the sales reputation score of the user; and
    subsequent to determining the combined reputational score for the user, presenting, to the one or more users of the online gaming platform, the store interface that depicts the multiple potential sellers as ranked, including the user being ranked in accordance with the combined reputation score that is different from the sales reputation score.

2. The method of claim 1, wherein the one or more user-specific in-game action metrics of the user include one or more types of activities performed by the user.

3. The method of claim 2, wherein the one or more types of activities performed by the user include at least one negative type of activity that is represented by at least a first one of the one or more user-specific in-game action metrics in a manner that reduces the combined reputational score for the user, and wherein the one or more types of activities performed by the user include at least one positive type of activity that is represented by at least a second one of the one or more user-specific in-game action metrics in a manner that increases the combined reputational score for the user.

4. The method of claim 3, wherein the at least one positive type of activity includes one or more of: chatting with other users, sharing with the other users, collaborating with the other users, helping the other users, and healing the other users.

5. The method of claim 1, wherein the presentation of the game to the user is facilitated through a client computing platform associated with the user, and wherein the action requests for the in-game actions by the user are received from the client computing platform.

6. The method of claim 1, further comprising:
    receiving feedback from the one or more buyers regarding the monitored sales transactions in which the user is selling the virtual items, wherein determination of the metric value of the sales metric is based on the received feedback.

7. The method of claim 1, further comprising:
    presenting, to one or more users of the online gaming platform, a second indicator that represents the metric value of the sales metric for the user.

8. The method of claim 1, wherein the one or more user-specific in-game action metrics include a first user-specific in-game action metric and a second user-specific in-game action metric, wherein a specific type of in-game activity by the user reduces the first user-specific in-game action metric and increases the second user-specific in-game action metric.

9. A system configured to determine seller reputation for a user of an online gaming platform, the system comprising:

one or more hardware processors configured by machine-readable instructions to: execute an instance of a game within the online gaming platform to facilitate presentation of the game to the user, and implement in-game actions in the instance of the game in response to action requests for the in-game actions by the user, wherein the presentation of the game is based on views of the game that are determined during execution of the game;

monitor sales transactions in which the user is selling virtual items that are usable within the online gaming platform to one or more buyers;

determine a metric value of a sales metric that represents a sales reputation score ascribed to the user by the one or more buyers, wherein the metric value is based on the monitored sales transactions;

present, to one or more users of the online gaming platform, a store interface that depicts multiple potential sellers as ranked in accordance to sales reputation scores for the multiple potential sellers, including the user being ranked in accordance to the sales reputation score represented by the metric value of the sales metric;

monitor user-specific in-game actions performed by the user within the instance of the game, wherein the user-specific in-game actions do not include the sales transactions;

determine one or more second metric values of one or more user-specific in-game action metrics that represent in-game activities performed by the user within the instance of the game, wherein determination is based on the user-specific in-game actions as monitored, and is not based on the sales transactions;

determine a combined reputational score for the user, wherein determination of the combined reputational score is based on combining both the metric value of the sales metric and the one or more second metric values of the one or more user-specific in-game action metrics; and subsequent to determining the combined reputational score for the user, present, to the one or more users of the online gaming platform, the store interface that depicts the multiple potential sellers as ranked, including the user being ranked in accordance with the combined reputation score that is different from the sales reputation score.

10. The system of claim 9, wherein the one or more user-specific in-game action metrics of the user include one or more types of activities performed by the user.

11. The system of claim 10, wherein the one or more types of activities performed by the user include at least one negative type of activity that is represented by at least a first one of the one or more user-specific in-game action metrics in a manner that reduces the combined reputational score for the user, and wherein the one or more types of activities performed by the user include at least one positive type of activity that is represented by at least a second one of the one or more user-specific in-game action metrics in a manner that increases the combined reputational score for the user.

12. The system of claim 9, wherein the one or more user-specific in-game action metrics include a first user-specific in-game action metric and a second user-specific in-game action metric, wherein a specific type of in-game activity by the user reduces the first user-specific in-game action metric and increases the second user-specific in-game action metric.

13. The system of claim 9, wherein the presentation of the game to the user is facilitated through a client computing platform associated with the user, and wherein the action requests for the in-game actions by the user are received from the client computing platform.

14. The system of claim 9, wherein the one or more hardware processors are further configured to:
receive feedback from the one or more buyers regarding the monitored sales transactions in which the user is selling the virtual items, wherein determination of the metric value of the sales metric is based on the received feedback.

15. The system of claim 9, wherein the one or more hardware processors are further configured to:
present, to one or more users of the online gaming platform, a second indicator that represents the metric value of the sales metric for the user.

16. The system of claim 11, wherein the at least one positive type of activity includes one or more of: chatting with other users, sharing with the other users, collaborating with the other users, helping the other users, and healing the other users.

* * * * *